Patented Nov. 28, 1933

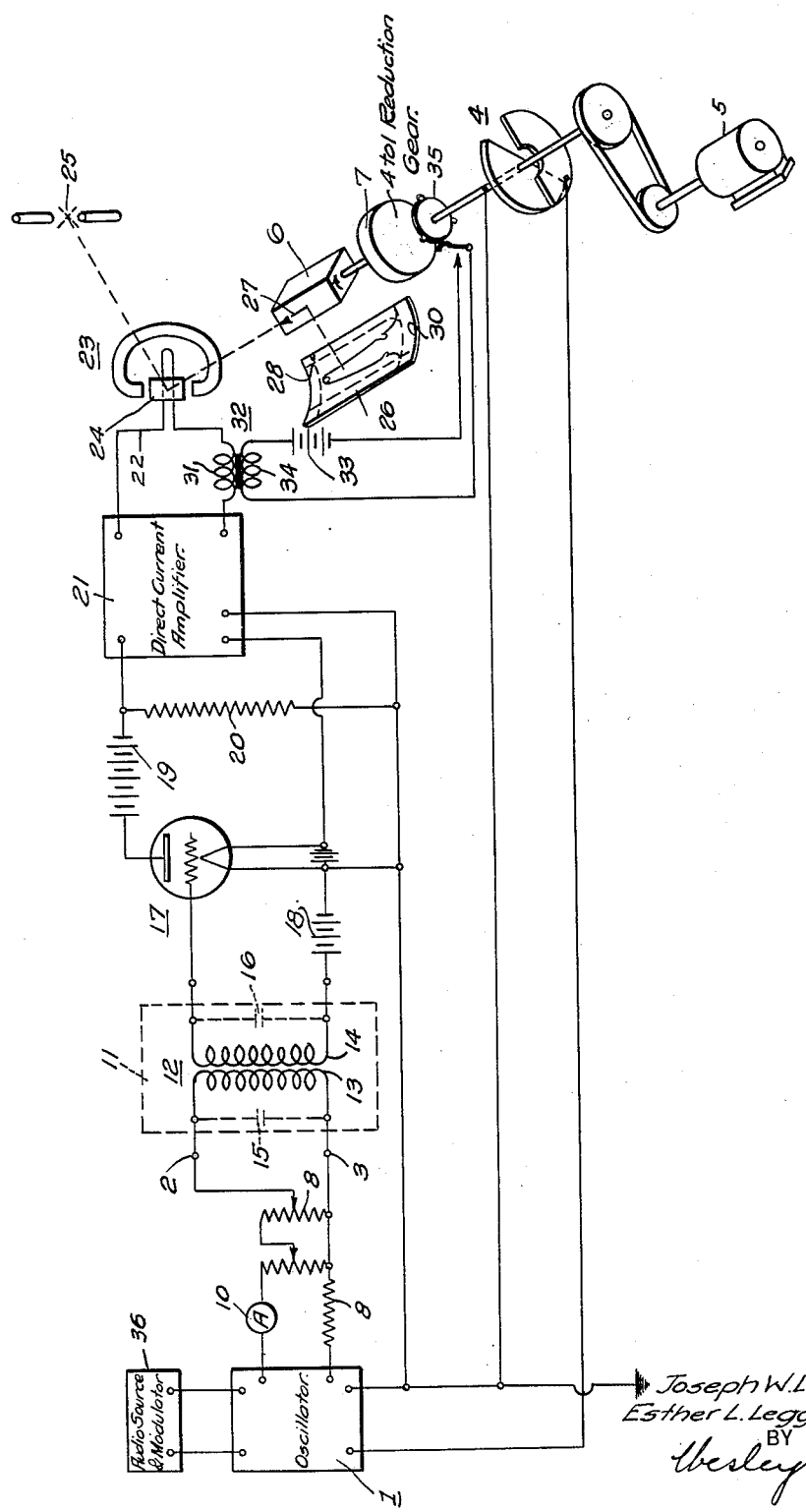

1,936,796

UNITED STATES PATENT OFFICE 1,936,796

TESTING DEVICE

Joseph W. Legg, deceased, late of Wilkinsburg, Pa., by Esther L. Legg, administratrix, Worcester, Mass., assignor to Westinghouse Electric and Manufacturing Company, a corporation of Pennsylvania Application January 23, 1930. Serial No. 422,896

3 Claims. (Cl. 175—183)

This invention relates to testing devices and it has particular relation to devices for testing and visually indicating the characteristics of reactance elements and radio apparatus.

In the design of modern radio receivers, of the type wherein a plurality of tuned circuits are simultaneously controlled by a single adjusting device, it is highly essential that the inductors in the said tuned circuits shall have substantially identical characteristics. In addition, in radio receivers of the superheterodyne type, wherein the intermediate transformers that handle the beat-frequency currents are provided with fixed tuning means, it is necessary that the said transformers shall be accurately tuned to the beat frequency and that they shall have certain predetermined sensitivity and selectivity characteristics.

It is, accordingly, an object of this invention to provide a device whereby the characteristics of reactance elements, such as inductors, or of other radio apparatus, may be accurately determined and adjusted.

Another object of this invention is to provide, in a device of the type described, means for visually indicating the characteristics of a reactor or other radio apparatus.

Still another, and more specific, object of this invention is to provide a device of the type described that shall be substantially automatic in operation.

The foregoing objects and others appurtenant thereto are obtained by constructing this improved indicating device somewhat in the nature of an oscillograph. In other words, means is provided for impressing oscillations upon the reactor or other radio apparatus, the characteristics of which are to be studied, means for causing said oscillations to vary in frequency over a predetermined range, means for deriving a direct current proportional to the alternating current flowing in the said reactor, means for causing a beam of light to move proportionally to said direct current, and further means, correlated to the rate of variation in the frequency of the oscillations, for visually indicating the amount of movement of the said beam of light.

The novel features to be considered characteristic of this invention are set forth with particularity in the appended claims. The invention itself, however, both as to its organization and its method of operation, together with additional objects and advantages thereof, will best be understood from the following description of a specific embodiment, when read in connection with the accompanying drawing, in which:

The single figure of the drawing is a diagrammatic representation of a testing and indicating device comprising a preferred embodiment of this invention.

The apparatus illustrated in the drawing comprises an oscillation generator 1, having output terminals 2 and 3, and being provided with a variable frequency determining element, such as a condenser 4, which may preferably, although not necessarily, be of the straight line frequency type. The movable plates of the condenser are continuously rotated by a motor 5 to cause the generated oscillations to vary, periodically over a predetermined frequency range.

The motor also rotates a four-side mirror 6 through a four-to-one reduction gear 7 to thereby cause it to make one-quarter of a revolution during the time the capacity of the tuning condenser 4 changes from minimum to maximum and back to minimum.

The oscillator is provided with an output circuit including a plurality of resistors 8 and a thermo-ammeter 10 whereby a known radio-frequency voltage may be applied across the output terminals 2 and 3.

The apparatus to be tested, which may be either a single inductor, a transformer, or a complete radio set, is indicated in the drawing by a broken-line rectangle 11 enclosing a transformer 12 having a primary winding 13 and a secondary winding 14. Each of the windings may be provided with a tuning condenser and they may be tuned, by their distributed capacity, to a desired frequency, or they may be untuned. The capacities associated severally with the windings have been indicated, therefore, by two condensers 15 and 16 shown in broken lines.

The terminals of the primary winding of the transformer under test are connected to the output terminals of the oscillator, and the secondary winding is included in the input circuit of a thermionic-tube voltmeter 17. A battery 18 is included in the input circuit of the thermionic tube for the purpose of biasing it to substantially the point at which no plate current will flow therein, and a battery 19 in the output circuit of the tube supplies plate potential thereto.

The thermionic tube 17 is coupled, by a resistor 20, to a direct-current amplifier 21, the output circuit of which includes the movable wires 22 of a galvanometer 23.

A minute mirror 24 is mounted on the galvanometer wires to reflect a ray of light from a fixed light source 25 upon the polygonal mirror 6 from which it is, in turn, thrown upon the rear surface of a translucent viewing screen 26. The polygonal mirror is so disposed with respect to the galvanometer mirror that a deflection of the latter from its normal position causes the ray of light to move axially of the polygonal faces in a direction indicated by an arrow 27 in the drawing.

The viewing screen is, preferably, provided with a plurality of reference marks 28 and 30 and is semi-cylindrical in shape, the axis of the cylinder being parallel to the shaft of the polygonal mirror.

In the operation of this improved measuring and testing system, when a definite radio-frequency voltage is induced across the secondary winding 14 of the transformer under test, or across the input circuit of any piece of radio apparatus having an output circuit connected to the tube-voltmeter 17, the output current from the said voltmeter changes proportionally to the amplitude of the input excitation thereof. The current changes in the coupling resistor 20 are amplified by the direct-current amplifier 21 and appear as proportional changes in the current traversing the galvanometer wires 22.

Inasmuch as the deflection of the galvanometer mirror and, consequently, the movement of the ray of light longitudinally of the polygonal mirror, is a function of the current passing through the galvanometer wires, the position of the reflected ray of light upon the viewing screen is a measure of the potential impressed across the input terminals of the thermionic tube voltmeter.

The said input potential is, in turn, proportional to the amount of current flowing in the transformed or inductor under test and is, obviously, greatest when the frequency of the oscillations impressed thereon coincides with the tuning of the said inductor. In other words, as the frequency of the oscillator is caused to vary from below the resonant point to above the resonant point, the deflection of the ray of light on the ground-glass screen is indicative of the tuning and decrement of the inductor.

The rotation of the mirror causes an apparent spreading apart of the successive positions assumed by the light reflected upon the screen, with the result that the point of light appears to trace a smooth curve that varies from the zero position to maximum and then returns to zero as the tuning of the oscillator passes through the resonance point of the inductor.

Inasmuch as the interposition of the reduction gear between the motor and the mirror causes a single face of the mirror to pass in front of the viewing screen 26, while the tuning condenser 4 is rotated once, it is obvious that two curves, one corresponding to an increasing frequency and one corresponding to a decreasing frequency, could be seen if proper precautions were not taken. Since it is necessary to view but one of the curves, however one half of each face of the mirror may be blackened to prevent reflection therefrom of the ray that corresponds to the decreasing frequency, or the screen may be so disposed with respect to the mirror that the ray corresponding to the decreasing frequency will not reach it.

In the event that this improved system is to be utilized in the operation of matching a plurality of inductors or transformers, it is desirable to provide means for visually indicating whether the device under test has the desired characteristics. To this end, the secondary winding 31 of an induction coil 32 is included in the galvanometer circuit, and the current is controlled from a battery 33, through the primary winding 34 thereof, by means of an adjustable contact-making device 35 actuated by the rotation of the shaft that drives the tuning condenser. A sharp impulse may, accordingly, be introduced into the galvanometer circuit at the desired point in the frequency-range of the oscillator, and the tuning of the device under test may be manually adjusted until the peak of the curve, as seen on the viewing screen, coincides with the dip caused by the impulse.

Additional impulses may be introduced into the galvanometer circuit, if desired, to indicate the selectivity of the transformer or inductor, as shown in the drawing.

In the event that a radio set, as distinguished from the component reactors thereof, is to be tested as to sensitivity and response, it has been found desirable to simulate an incoming radio signal by modulating the oscillator output-current at audio frequency before applying it to the set. Inasmuch as modulation circuits and methods are familiar to those skilled in the art, the audio-frequency source and the modulator has been indicated by a rectangle 36.

It is, therefore, evident that, by means of this invention, a simple and automatic device has been provided for determining the characteristics of reactors designed for use in radio circuits. This improved measuring and indicating device is not limited to the use described, however, it being obviously capable of many other applications.

Although a specific embodiment of this invention has been shown and described, many modifications thereof are possible. This invention, therefore, is not to be restricted except insofar as is necessitated by the prior art and by the spirit of the appended claims.

What is claimed is:

1. A measuring device comprising means for deriving a direct current in response to an alternating potential, means for causing the frequency of said alternating potential to periodically change, means for causing a light beam to move from a zero position in response to said direct current and means whereby the movement of said beam gives a visual indication.

2. A measuring device comprising means for deriving a direct current in response to an alternating potential, means for causing the frequency of said alternating potential to periodically change through a recurrent cycle, a rotating polygonal mirror and means for causing a light beam to move longitudinally of the faces of said mirror during its rotation, the speed of rotation of said mirror and the periodic change in the frequency of said oscillating potential being so correlated that complete cycle of said change occurs during the time the mirror has made I/N revolutions, where N is the number of faces of the mirror.

3. A measuring device comprising means for deriving a direct current in response to an alternating potential, means for causing the frequency of said alternating potential to periodically change, means for causing a beam of energy to move from a zero position in response to said direct current and means whereby the movement of said beam gives a visual indication.

ESTHER L. LEGG.
*Administratrix of the estate of Joseph W. Legg, deceased.*